United States Patent [19]

Rosaen

[11] Patent Number: 4,701,259

[45] Date of Patent: Oct. 20, 1987

[54] FLUID FILTER WITH FILTER RETAINER

[75] Inventor: Nils N. Rosaen, Brighton, Mich.

[73] Assignee: Rosedale Products, Inc., Ann Arbor, Mich.

[21] Appl. No.: 844,533

[22] Filed: Mar. 27, 1986

[51] Int. Cl.4 ............................................. B01D 29/14
[52] U.S. Cl. ................................... 210/450; 210/452; 210/455; 210/484
[58] Field of Search ............... 210/315, 317, 444, 445, 210/448, 451, 452, 453, 455, 457, 458, 484, 489, 437, 446, 447, DIG. 6, 450; 55/529, 495, 501, 510, 337

[56] References Cited

U.S. PATENT DOCUMENTS

| | | | |
|---|---|---|---|
| 2,864,505 | 12/1958 | Kasten | 210/444 |
| 3,206,034 | 9/1965 | Anderson | 210/444 |
| 3,640,392 | 2/1972 | Smith et al. | 210/445 |
| 3,771,664 | 11/1973 | Schrink et al. | 210/445 |
| 3,774,769 | 12/1973 | Smith | 210/445 |
| 4,024,065 | 5/1977 | Morgan, Jr. | 210/448 |
| 4,259,188 | 3/1981 | Morgan | 210/448 |
| 4,379,058 | 4/1983 | Bolton | 210/451 |
| 4,419,240 | 12/1983 | Rosaen | 210/444 |
| 4,460,468 | 7/1984 | Morgan | 210/445 |

Primary Examiner—Richard V. Fisher
Assistant Examiner—Wanda L. Millard
Attorney, Agent, or Firm—Gifford, Groh, VanOphem, Sheridan, Sprinkle and Dolgorukov

[57] ABSTRACT

A fluid filter includes a housing having a fluid inlet, a fluid outlet, and an open top filter chamber intermediate the inlet and the outlet. The filter chamber is adapted to receive a filter basket holding a filter bag therein. The filter basket is supported in the filter chamber by the bottom end of the basket which engages an inwardly radiused wall portion of the housing. The basket includes a support plate for supporting the bottom of the filter bag within the basket above the bottom end portion of the basket. The lower end of the basket beneath the plate includes a wall portion which can be modified to conform to the shape of the housing to stably support the filter basket in a fixed position within the filter chamber. The filter bag includes a seal ring adapted to seal against the periphral wall of the filter chamber so that fluid entering the filter through the inlet is forced to pass through the filter element before it reaches the outlet, and the seal member is supported by the top lip of the filter basket.

19 Claims, 5 Drawing Figures 4,701,259

FLUID FILTER WITH FILTER RETAINER

BACKGROUND OF THE INVENTION

I. Field of the Invention

The present invention relates generally to filters for removing particulate matter and the like from fluid passing through a fluid circuit and, more particularly, to a filter having a housing including a chamber intermediate its inlet and outlet adapted to receive a basket which supports a filter element therein.

II. Description of the Prior Art

There are many known types of filtering devices in which a filter element is disposed in a chamber intermediate the fluid inlet and the fluid outlet of a filter housing. One known type of filter element used in such housings comprises a bag type filter. Such filters are typically supported by a perforated cage or basket which supports the flexible sides of the bags, and the basket has a diameter less than the diameter of the chamber in the filter housing so that fluid which enters the filter through the open top of the bag passes through the filter element and into an annular passageway between the basket and the peripheral wall of the chamber. Since a flow passageway must be provided between the annular passageway and the outlet of the filter, the filter basket is often suspended above the bottom of the filter chamber by means for supporting the top of the cage at a fixed position. The outlet is then provided in the bottom of the filter housing.

The previously known means for suspending the filter basket often comprises an annular ring secured to the inner peripheral wall of the filter housing and a radially projecting lip provided on the basket which rests upon the ring. Moreover, the annular ring also supports a sealing ring adapted to engage the periphery of a portion of the cage to provide a fluid type seal between the filter element and the peripheral wall of the filter chamber so that fluid flowing from the inlet toward the outlet must pass through the filter element. The construction of an annular ring on the inner peripheral wall of the filter housing substantially complicates the construction of the filter and the provision of the sealing ring in the annular ring further increases the labor and expense of constructing the filter.

SUMMARY OF THE PRESENT INVENTION

The present invention overcomes all of the above mentioned disadvantages by providing a filter construction in which the basket in the filter chamber of the filter housing is supported at its bottom by a housing wall. As a result, the cage can be supported without the need for constructing an annular suspension ring as in the previously known cage supporting filters. Moreover, the filter bag includes a seal ring adapted to seal against the peripheral wall defining the filter chamber. The seal can be positioned by means of a radially extending lip at the top of the basket. Thus, the present invention provides means for stably supporting the basket in a fixed position within the filter housing but which substantially simplifies the construction of the filter housing compared to previously known basket suporting structures.

In the preferred embodiment, the basket is adapted to receive a filter element in the form of a filter bag and the perforated cage is longer than the length of the bag. The basket includes appropriate means, such as a plate, for supporting the bottom of the bag in a stable position within the cage. The lower end of the cage beneath the plate includes a perforated wall portion providing fluid communication between the annular flow passage outside of the cage and the perforated bottom of the cage which then communicates with the outlet of the filter housing. Preferably, the cage engages a portion of the peripheral wall defining the filter chamber, and the bottom end of the basket is configured to substantially conform with the shape of a peripheral wall. Preferably, the peripheral wall of the chamber has a reduced diameter near the bottom of the filter housing and the correspondingly shaped end portion of the basket provides for stable and accurate positioning of the basket within the filter housing.

BRIEF DESCRIPTION OF THE DRAWING

The present invention will be more clearly understood by reference to the following detailed description of a preferred embodiment when read in conjunction with the accompanying drawing, wherein.

DETAILED DESCRIPTION OF A PREFERRED EMBODIMENT OF THE PRESENT INVENTION

Figure 1:
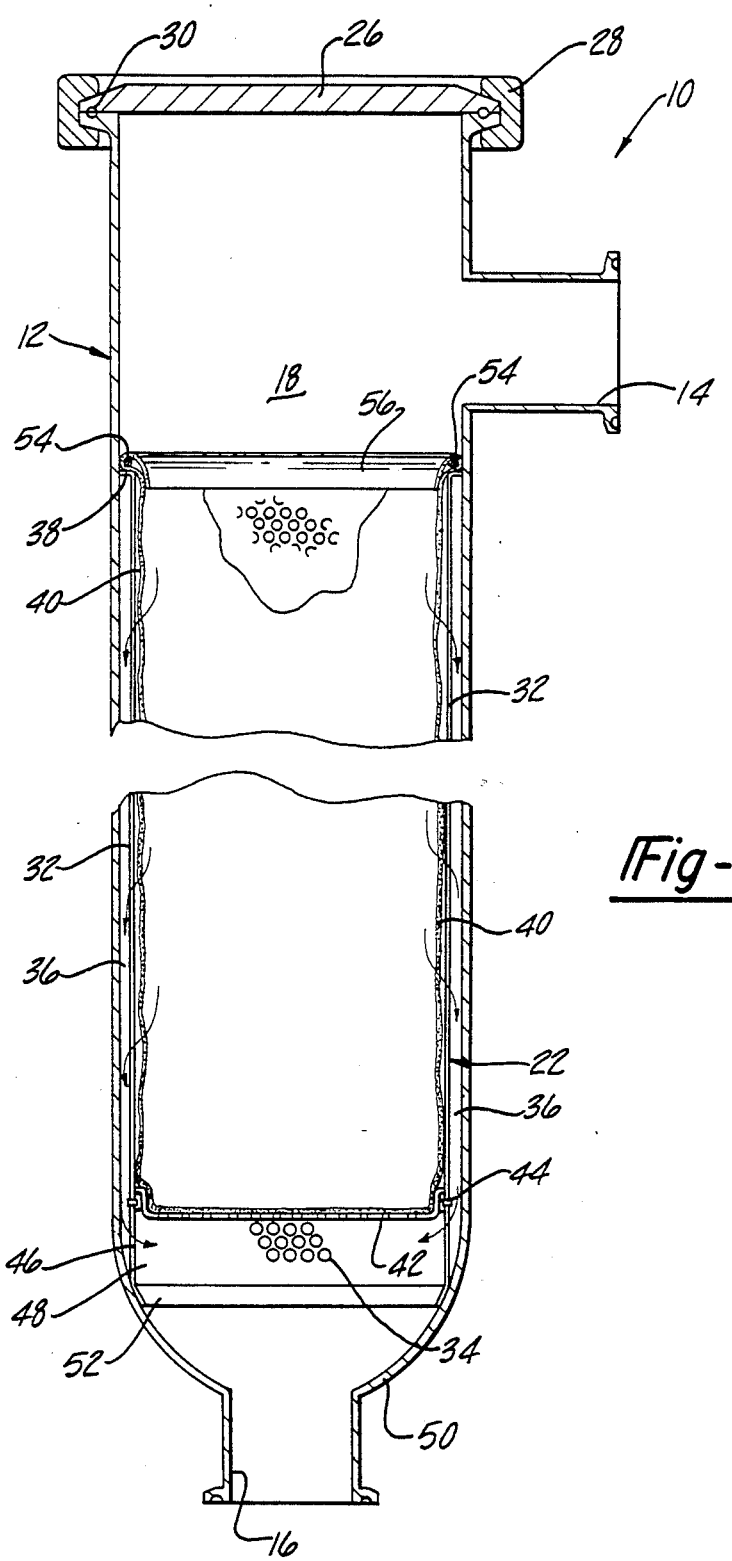
FIG. 1 is a sectional view of a filter constructed in accordance with the present invention.

As shown in the drawings, a fluid filter 10 according to the present invention comprises a substantially cylindrical filter housing 12 having an inlet 14 and a fluid outlet 16 (FIG.1). The filter housing 12 defines a filter chamber 18 intermediate and in fluid communication with the inlet 14 and outlet 16. The chamber 18 is open at its top so that the housing 12 is adapted to receive a filter basket 22. The open top of the chamber 18 slidably receives the filter basket 22 therethrough. A cover 26 fits over the open top of the housing 12 and is locked into position by the removable clamp 28. A seal ring 30 seals the cover to the upper end of the housing 12.

In the preferred embodiment, the cylindrical chamber 18 is adapted to receive the cylindrical basket 22. A peripheral wall 32 of the basket 22 is perforated as shown at 34. The peripheral wall 32 of the basket 22 has a diameter less than the diameter of of the housing 12 defining the chamber 18 thereby forming an annular passageway 36 intermediate the peripheral wall 32 and the wall of the chamber 18.

As is shown in FIG. 1, an annular lip 38 at the top of the basket 22 engages the peripheral wall of the housing 12 in order to stably position the top of the basket 22 within the chamber 18. Although the annular lip 38 is shown integrally formed in the basket 22, it is to be understood that the top portion of the basket 22 may be separately constructed thereby providing a substantially cylindrical basket 22 with no lip 38. In this alternative embodiment, the lip 38 is formed as part of a separate collar which mates with the basket 22 in order to position the top of the basket 22 within the chamber 18.

A filter element 40 in the form of a filter bag, substantially the same diameter as the basket 22, can be slidably inserted therein. However, the filter element 40 is shorter than the basket 22 and as a result, the basket 22 is provided with a support plate 42 spaced apart from the lower end of the basket 22 which supports the bottom of the filter bag 40 within the basket 22. The support plate 42 can be conveniently maintained in position by pins 44 engaged in apertures in the peripheral wall 32 of the basket 22, as shown in FIG. 1, or by alternate means as shown in FIGS. 2 through 5 and discussed in detail herein. Although the present invention is described in conjunction with a filter bag 40, alternatively the filter bag 40 may be eliminated by constructing the filter basket 22 with very fine perforations in order to filter larger contaminants. Additionally, a wire cloth lining may be substituted for the basket 22 to provide the necessary support while filtering finer contaminents.

Referring still to FIG. 1, the end portion 46 of the basket 22 extending below the plate 42 rests upon the peripheral wall portion of the housing at the bottom of the chamber 18, whereby the basket 22 is held in a fixed position by engagement of the end portion 46 with the wall of the housing 12. As shown in the preferred embodiment, the bottom portion of the housing 12 includes an inwardly radiused wall portion extending toward the center of the chamber 18 and the outlet 16. Thus, the radiused wall portion 50 provides a reduced diameter portion of the housing against which the basket 22 can be seated. Preferably, the bottom of the peripheral wall 32 of the basket 22 is shaped to substantially conform with the portion of the wall portion 50 which it engages so as to stably retain the basket 22 in its central operative position within the chamber 18. Thus, as shown at 52 in FIG. 1, the lower end of the basket 22 is beveled. The lower portion of the end 46 of the basket 22 is well adapted to be shaped to a variety of conforming shapes.

The upper end of the filter element 40 includes a ring 54 adapted to engage the inner peripheral wall of the housing 12 defining the chamber 18 in the housing 12. The seal ring 54 is secured to the upper edge of the bag 40 by adhesive or the like, and can be rested upon the annular lip 38. Alternatively, the ring 54 may be secured to the top of the filter bag 40 within the fold 56 of the filter bag 40. As a result, the housing wall need not be modified by inclusion of an annular ring or lip which simplifies the construction of the housing. Nevertheless, the seal ring 54 effectively seals the filter element 40 to the peripheral walls of the housing 12 so that all fluid flowing through the inlet 14 is forced to pass through the filter element 40 while passing toward the outlet 16.

Figure 2:
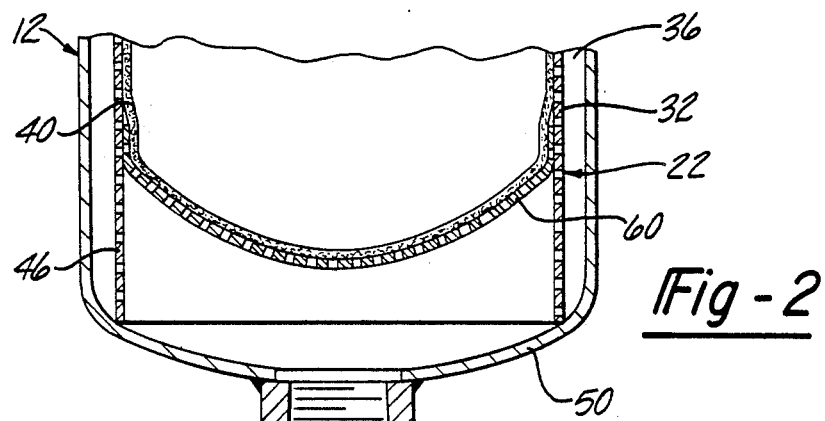
FIG. 2 is an enlarged detail of a portion of an alternative embodiment of the present invention.

The alternative embodiments shown in FIGS. 2 through 5 disclose various means of supporting the bottom of the filter bag 40. In FIG. 2, a concave bottom plate 60 is shown secured to the wall 32 of the basket 22. The plate 60 is perforated in order to provide fluid flow through the bottom of the filter bag 40 and the plate 60. The concave shape of the plate 60 generally conforms to the shape of the filter bag 40 and increases the filter area of the bottom portion of the present invention.

Figure 3:
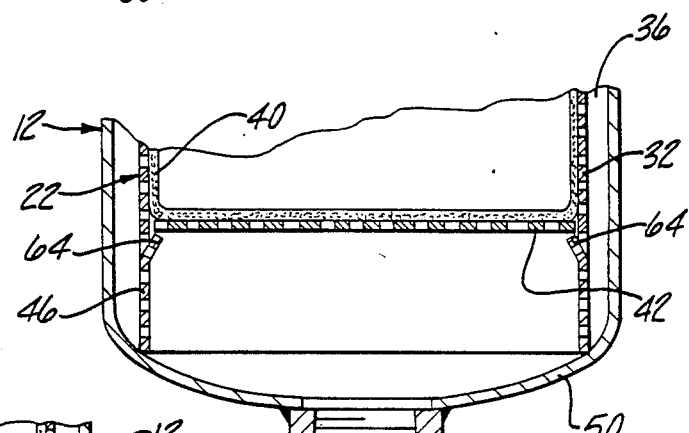
FIG. 3 is an enlarged detail of a portion of a further alternative embodiment of the present invention.

In FIG. 3, the bottom plate 42 is supported by inwardly extending flanges 64 formed from the bottom portion of the basket wall 32. The flange 64 may extend around the entire wall 32 or may be intermittent to provide support at a plurality of points beneath the plate 42. The plate 42 is removably disposed within the basket 22 and thus allows use of the filtering device 10 without the plate 42 to accomodate a filter bag 40 of greater length.

Figure 4:
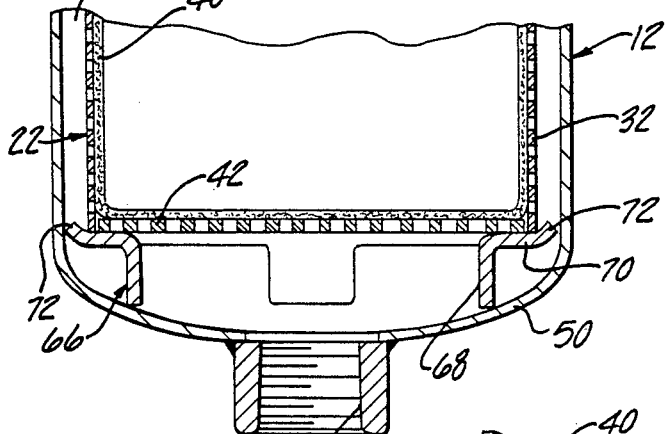
FIG. 4 is an enlarged detail of a portion of a still further embodiment of the present invention.

In the embodiment shown in FIG. 4, the filter basket 22 does not rest on the bottom of the housing 12 but rather rests on a support structure 66. The support structure 66 includes at least three downwardly depending legs 68 which rest on the housing bottom 50 and an annular support surface 70 disposed substantially perpendicular to the legs 68. The support surface 70 includes an outwardly extending flange portion 72 which facilitates proper positioning of the support structure 66 within the housing 12, as well as positioning the filter basket 22. The support surface 70 also supports the perforated bottom plate 42. Thus, the embodiment of the present invention is assembled by first placing the support structure 66 within the housing 12. The flange portion 72 ensures that the structure 66 is properly seated within the housing 12. Thereafter, the bottom plate 42 and the basket 22 are inserted with the flange 72 again ensuring proper positioning of these elements. As with the other embodiments, once the basket 22 is properly positioned the filter bag 40 is inserted therein.

Figure 5:
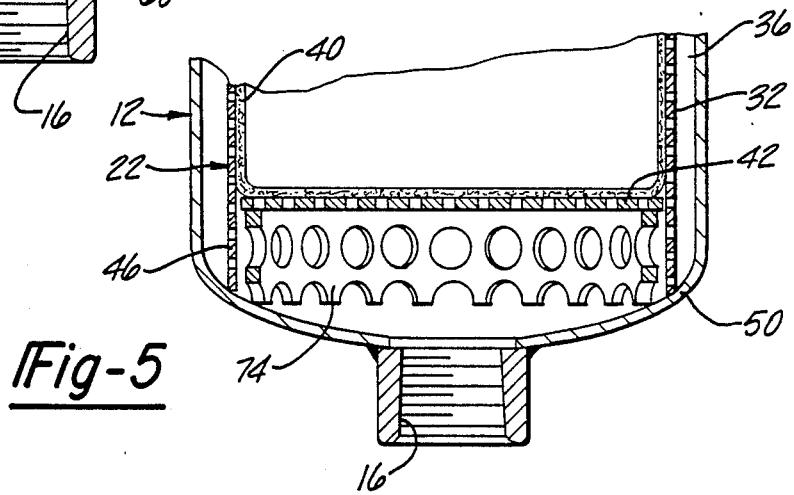
FIG. 5 is an enlarged detail of a portion of a still further alternative embodiment of the present invention.

Finally, FIG. 5 shows a still further embodiment of the present invention wherein a short, perforated cylinder 74 is provided for supporting the plate 42. The cylinder 74 has a diameter smaller than the diameter of the filter basket 22 in order to fit within the walls 32 of the basket 22. The plate 42 rests on top of the cylinder 74 thereby allowing removal of the plate 42 and cylinder 74 independent of the filter basket 22.

Having thus described the important structural features of the preferred embodiment of the present invention, it will be readily understood that the filter 10 according to the present invention is substantially simpler in construction than previously known filtering devices in which a filter basket is suspended by an annular ring formed in the filter chamber of the housing. Nevertheless, the basket 22 is fixedly positioned within the housing by resting on a lower housing portion or wall of the housing, thus maintaining the annular passageway through which the fluid flows after passing through the filter element 40. Moreover, fluid passing through the annular passageway is then reintroduced to the center of the bottom portion 46 of the basket to flow through the perforated bottom wall of the basket 22 and toward the outlet 16. In each of the embodiments disclosed herein the bottom plate 42 is removable thus allowing operation with or without support for the bottom of the filter bag 40.

Having thus described the present invention, many modifications thereto will become apparent to those skilled in the art to which it pertains without departing from the scope and spirit of the present invention as defined in the appended claims.

I claim:

1. In combination with a filter housing having a fluid inlet and a fluid outlet and defining an open topped chamber intermediate said inlet and outlet; a fluid pervious open-topped filter basket dimensioned to be received in said chamber through the open top of said chamber; and a filter bag dimensioned to be received in said filter basket through the open top of the basket, the improvement comprising:

means for positioning said basket in said chamber by supporting a bottom of said basket; and means for supporting a bottom of said bag within said basket and above the bottom of said basket, said means for supporting comprising a perforated support plate secured to the filter basket.

2. The invention as defined in claim 1 wherein said means for positioning comprises means for supporting said basket by engagement of the bottom of said basket with a reduced diameter portion of said housing.

3. The invention as defined in claim 2 wherein said reduced diameter portion comprises a peripheral wall portion of said housing at the bottom of said chamber.

4. The invention as defined in claim 3 wherein said basket includes a peripheral wall portion at the bottom of said basket shaped to substantially conform with said peripheral wall portion of said chamber.

5. The invention as defined in claim 4 wherein said basket includes a beveled end portion at its bottom.

6. The invention as defined in claim 3 wherein said peripheral wall portion is radiused inwardly toward the center of said chamber.

7. The invention as defined in claim 1 wherein said filter bag comprises means providing a seal between the top of said filter bag and said housing when said bag is fully inserted within said basket.

8. The invention as defined in claim 7 wherein said sealing means comprises a sealing ring secured at the upper, peripheral edge of said open topped filter bag, and means for retaining said ring at the top of said basket.

9. The invention as defined in claim 8 wherein said retaining means comprises a radially extending lip at the upper edge of said basket.

10. The invention as defined in claim 1 wherein said support plate is removably secured to said filter basket.

11. The invention as defined in claim 10 wherein said support plate is retained by a plurality of support pins extending inwardly from said filter basket.

12. The invention as defined in claim 10 wherein said support plate is retained by flange members extending inwardly and formed from said filter basket.

13. The invention as defined in claim 10 and further comprising a cylindrical support member disposed within said filter basket wherein said cylindrical support member supports said support plate.

14. The invention as defined in claim 1 wherein said support plate is concave and permanently secured to said filter basket.

15. The invention as defined in claim 1 wherein said means for fixedly positioning said basket comprises a support structure disposed at the bottom of said filter chamber and engaging a reduced diameter portion of said housing.

16. The invention as defined in claim 15 wherein said support structure comprises an annular support surface and at least three downwardly depending legs, said legs engaging the bottom of said housing.

17. In combination with a filter housing having a fluid inlet and a fluid outlet and defining an open topped chamber intermediate said inlet and outlet; a fluid pervious open topped filter basket dimensioned to be received in said chamber through the open top of said chamber; and a filter bag dimensioned to be received in said filter basket through the open top of the basket, the improvement comprising:

means for positioning said basket in said chamber by supporting a bottom of said basket, said means for positioning including a support structure disposed at the bottom of said filter chamber and engaging a reduced diameter portion of said housing, wherein said support structure comprises an annular support surface and at least three downwardly depending legs, said legs engaging the bottom of said housing.

18. The invention as defined in claim 17 wherein said filter basket and a perforated support plate removably engage said support surface and wherein said plate supports the bottom of said filter bag within said basket.

19. The invention as defined in claim 17 wherein said support structure includes a flange portion extending outwardly from said annular support surface wherein said flange portion facilitates positioning of said support structure within said chamber and said filter basket on said surface.

* * * * *